Dec. 4, 1928.

D. DANA

HEATING SYSTEM

Filed Oct. 23, 1923   4 Sheets-Sheet 1

Inventor,
Duncan Dana,
by Frank G Hattie
His Attorney.

Dec. 4, 1928.
D. DANA
1,694,001
HEATING SYSTEM
Filed Oct. 23, 1923 4 Sheets-Sheet 2
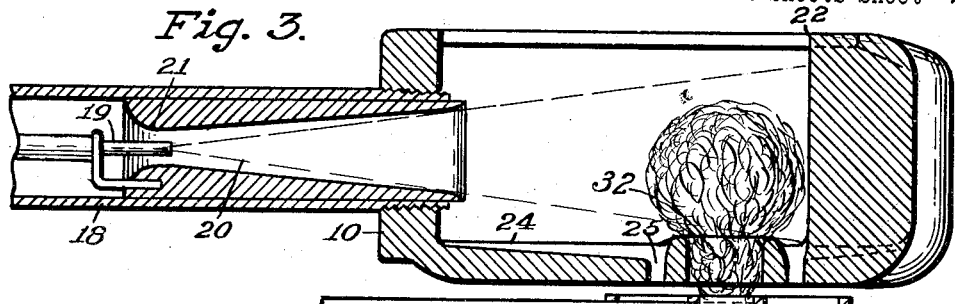
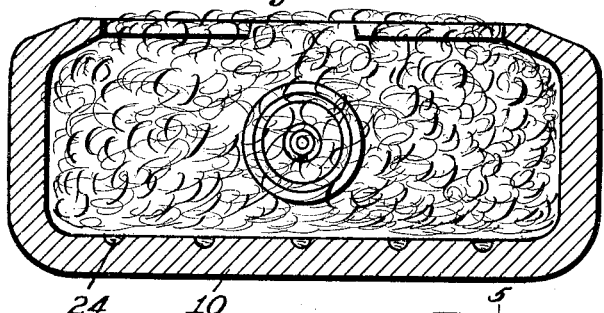
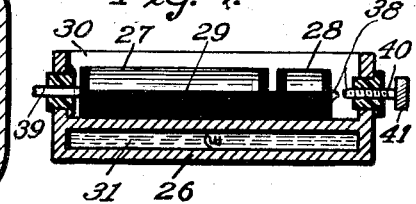
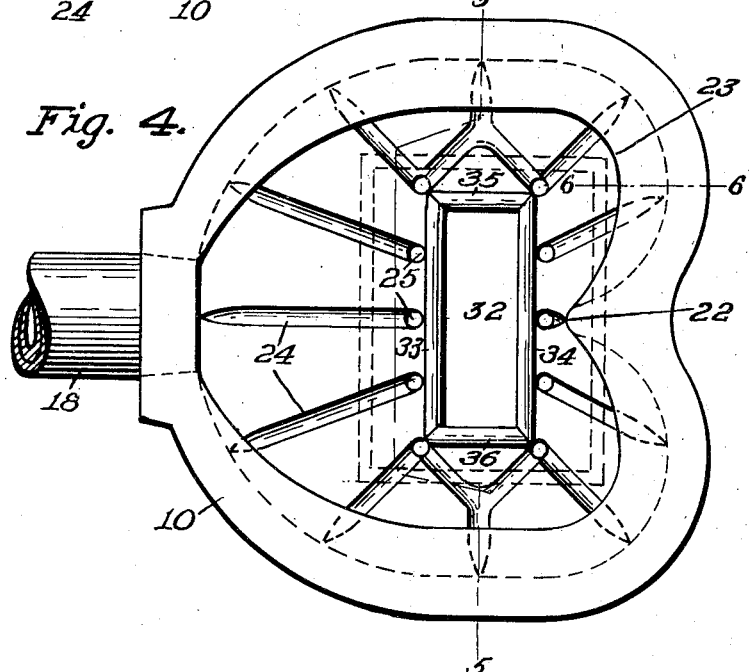
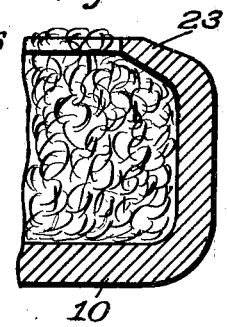
Inventor,
Duncan Dana,
by Frank G Hattie
His Attorney.

Dec. 4, 1928.
D. DANA
1,694,001
HEATING SYSTEM
Filed Oct. 23, 1923  4 Sheets-Sheet 3
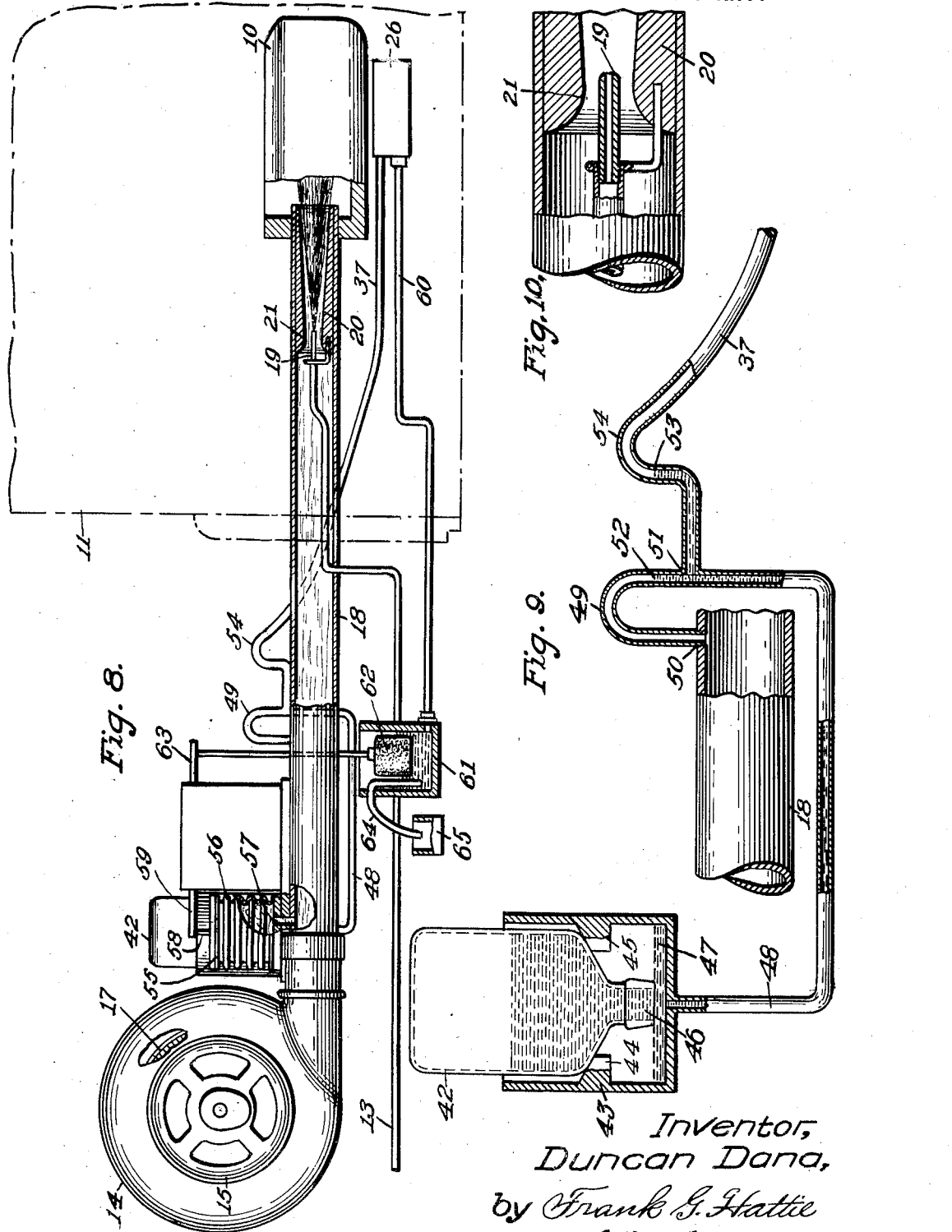
Inventor,
Duncan Dana,
by Frank G. Hattie
His Attorney.

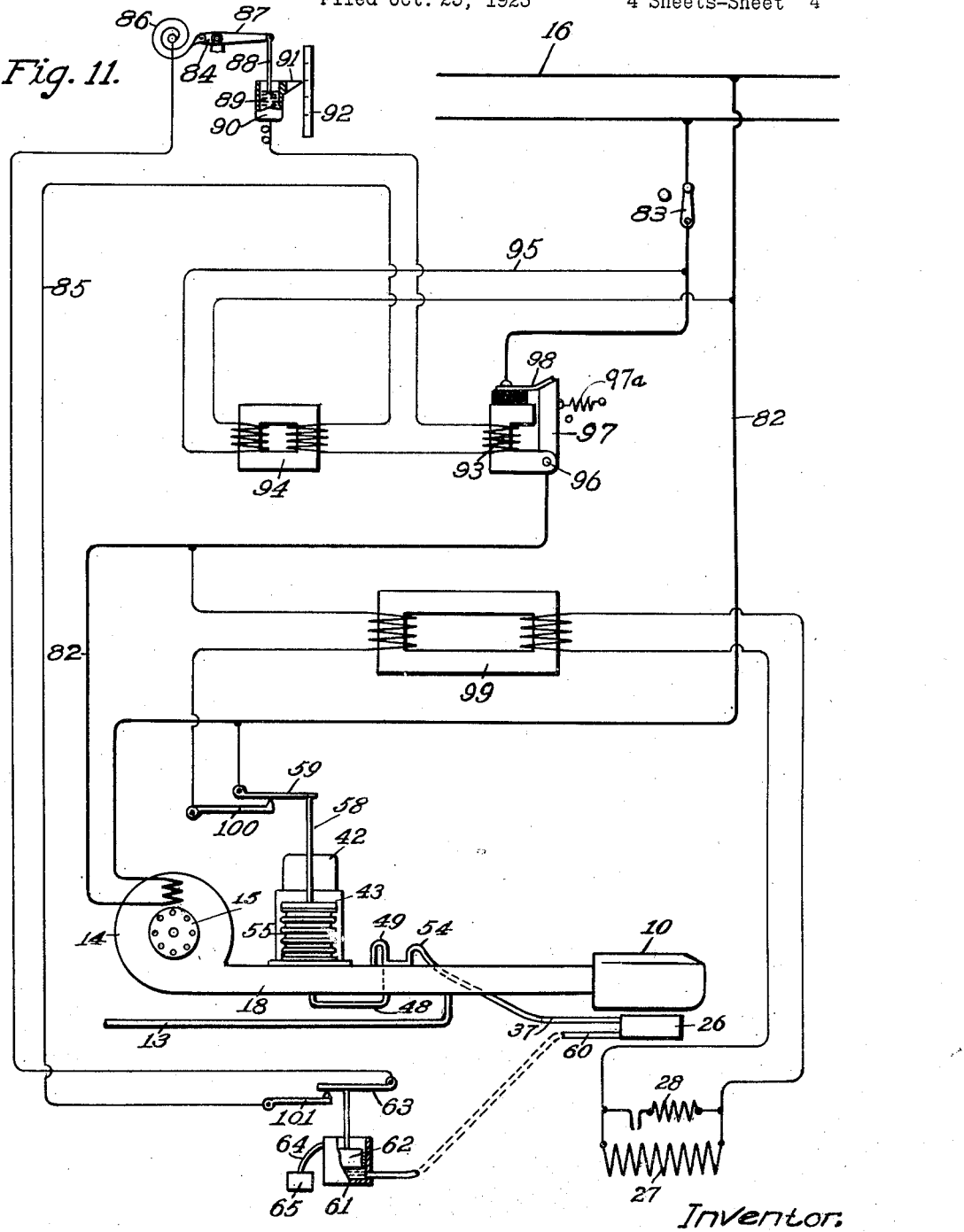

Patented Dec. 4, 1928.

1,694,001

UNITED STATES PATENT OFFICE.

DUNCAN DANA, OF MARBLEHEAD, MASSACHUSETTS.

HEATING SYSTEM.

Application filed October 23, 1923. Serial No. 670,287.

The invention relates to heating systems in which any type of furnace can be used, such as steam, hot water, or hot air, and consists of an improved fire box especially adapted for the use of liquid or hydro-carbon fuel.

The invention further consists of an automatic control for regulating the liquid fuel for an indefinite period of time without the attention of an operator.

The invention further consists of an automatic starting mechanism controlled by a thermostat which operates an electrical motive agent for driving and operating the various devices embodied in the system.

The object of the invention is to provide reliable automatic heating systems in which liquid or hydro-carbon fuel is used for generating heat for any of the various types of furnaces now in use which can be readily set up in new furnaces or adapted to old ones already installed. A further object of the invention is to provide a reliable automatic heating system which is durable and cheap to manufacture.

In the accompanying drawings which form a part of this specification, Figure 1 is a general view showing my improved heating system; Figure 2 is a vertical section of the main fuel supply tank.

Figure 3 is a longitudinal section of the fire box and starting unit and also showing parts of the various connecting members.

Figure 4 is a plan view of the fire box.

Fig. 5 is a section taken on the line 5—5.

Figure 6 is a fragmentary sectional view taken on the line 6—6, Figure 4.

Figure 7 is a vertical section of the fuel drain box showing the starting and light coils.

Figure 8 is a side elevation of the feeding fuel mechanism partly broken away showing the projection of the fuel into the fire box.

Figure 9 is an enlarged view of the starting fuel supply system.

Figure 10 is an enlarged view of the fuel nozzle and its relation to the cooperating members.

Figure 11 is an electric diagram of the automatic device for controlling the regulating system.

Figure 1:
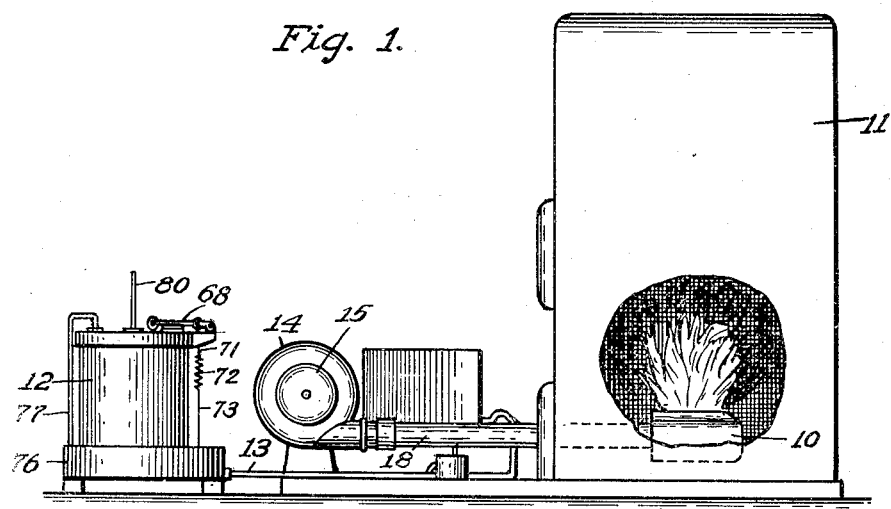
Figure 2:
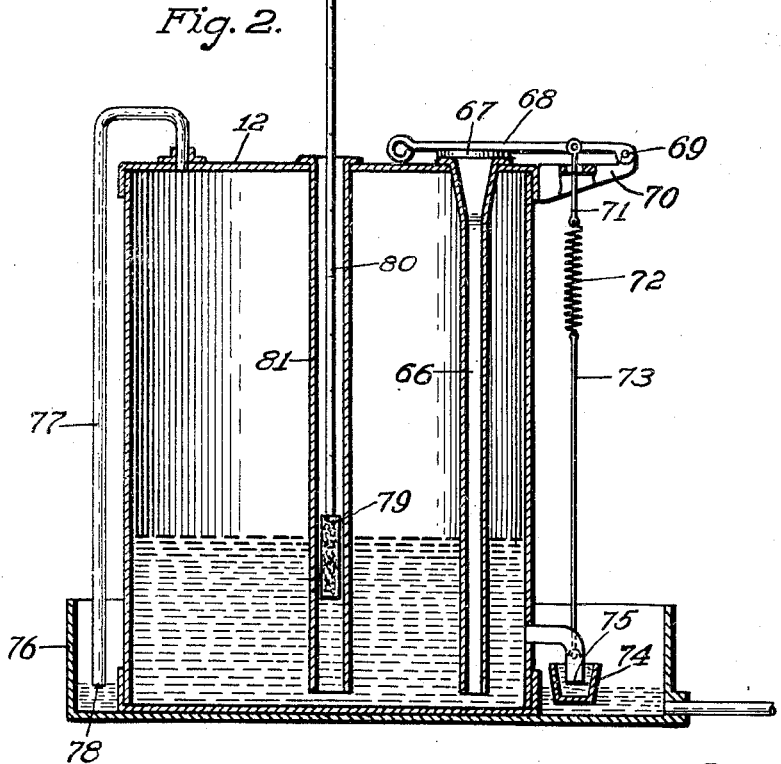

Referring to the drawings which show my improved heating system having a burner box 10 located in the combustion chamber of the furnace 11, the burner box 10 is designed to burn hydro-carbon or liquid fuel and is so constructed that the fuel is thoroughly mixed with the air and atomized before combustion takes place, thereby eliminating soot and obtaining the highest degree of efficiency. The burner box 10 can be used in any furnace and is especially adapted for use in steam, hot water, or hot air types of heating devices. The burner box 10 is of special construction for directing and delivering the fuel for obtaining the greatest number of heat units necessary to satisfy the varying conditions and temperatures and receives its fuel from the supply tank 12 through the pipe 13. To obtain suitable combustion an air supply is necessary and is generated by the blower 14 which is driven by the electrical motor 15 from a suitable electrical source 16. The blower 14 is provided with a rotating impeller 17, which normally furnishes about one ounce of air pressure, which is led through the conduit 18, the opposite end of which is threaded into the burner box 10 and allows the fuel mixture to enter the box for the purposes specified. The fuel supply pipe 13 is provided with a nozzle 19. This is accomplished by making a conical tube, or better known as a Venturi tube, having a restricted throat 21, and as the air in the pipe 18 reaches the throat of the Venturi tube, the velocity is increased to the extent of about four ounces of suction which draws the fuel from the pipe 13 and mixes it with the air which forms a combustible mixture. To properly mix the fuel and atomize it, I have provided an especially designed fire box, as shown in Figures 3, 4, 5, and 6. As the fuel is forced into the fire box from the conduit 18, it is divided at the point 22, which is a peak of the projection extending out of the rear of the fire box. On either side of the point 22 the fire box is curved, which causes the fuel to be circulated back upon itself and thoroughly mixed. At the same time, the fuel mixture is thrown upwardly and downwardly against the bottom of the fire box and also against the baffle 23, which also throws the mixture back against itself, thereby giving a second mixing and at the same time holds it inside the burner box sufficiently long to permit the heat in the box thoroughly to volatilize the hydrocarbon fuel. Hydro-carbon breaks up very rapidly under heat processes, and the main object of my fire box is to hold the mixture for a short period of time under the flame to break up the atoms into a gas before they ignite and pass into the flame. It at any time the mixture is not thoroughly atomized or is condensed into liquid, or passes into the fire box in liquid form, it drops to the bottom of the fire box and passes off through the grooves 24 and apertures 25, and drops into the drain box 26. Located in the drain box 26 is pilot heating device 27 and lighting device 28. The pilot lighting device consists of an electrically heated coil separated from the box by insulation 29. The coils rest on the insulation 29 in the chamber 30, which extend across the casing of the drain box 26. Cast under chamber 30 is an aperture 31, which allows the fuel to circulate in the drain box, as the waste fuel drops off from both sides of the opening 32, formed in the burner box 10. As the fuel drops down from the burner box 10, it goes directly into the drain box each side of the heating coil. This is arranged so that fuel will not drop into the heating coil chamber, and at the same time the fuel can find its level on both sides of the heating and lighting coils by passing through the aperture 31. When the fuel mixture is projected from the conduit 18 and recirculated and mixed in the burner box 10, some of it might be forced into the igniting flame aperture 32. To obviate this, upwardly extending curved projections 33, 34, 35, and 36 provided, which direct the fuel mixtures upwardly away from the opening 32. To start the burner, a special automatic device is provided, a description of which will be taken up hereinafter. The starting fluid is led through the pipe 37 into the heating chamber 30 above the coils 27 and 28, around and thoroughly heated and vaporized. The vapor passes upwardly through the aperture 32 in the burner box, and at the same time the charge of starting fluid is fired by the spark points 38 which are energized by the spark coil 28 and are connected to the main source of electrical current. The heating and lighting coils are provided with contacts 39 and 40 and are also connected to the main source of electrical current. The contact 40 can be adjusted by the knurled head 41.

The starting device consists of a suitable receptacle 42 for holding the starting fuel, which is in the form of a bottle and is located in an inverted position, as shown in Figure 9. The bottle 42 rests in a tank 43 and is supported on the lugs 44 and 45. The receptacle 42 is filled with liquid fuel, and is allowed to run out into the tank 43 until it reaches the opening 46, of the bottle 42 at which time the flow is stopped by the atmospheric pressure on the outside. The principle is well known in physics, that when the fuel or fluid is poured into the receptacle 42, it drives out the air and in this particular case the atmospheric pressure overcomes the vacuum in the receptacle 42 and holds the fuel in position until the fuel 47 in the bottom of the tank is led off, which allows air to enter the receptacle 42 and more fuel is fed down to the level indicated by the numeral 47. The fuel indicated by the numeral 47 is led off through the pipe 48, which extends upwardly into a goose neck 49, the opposite end of which enters the air conduits 18 and 50. Extending out of the pipe 48 at 51 is the pipe 37 which extends upwardly into a secondary goose neck 54 to allow the fuel level in the pipe 48 to be maintained at the points 52 and 53, which is the supply of one charge of starting fluid. When the motor 15 and compressor 14 start to rotate, the air pressure commences to build up to one ounce in the conduit 18. This initial blast of air or building up of the pressure causes the air to enter the pipe at 50 and forces the fuel at the level between the numerals 52 and 53 into the pipe 37 and in turn to the heating chamber 30, where it is atomized and fired to form a pilot flame. After the charge is fired, the heating and sparking currents are shut off automatically by the bellows 55 having corrugations 56 which allow it to expand under pressure. That is, when the air builds up in the conduit 18, air passes into the restricted opening 57, which gradually expands the bellows upwardly carrying with it the rod 58 which acts against the switch lever 59, thereby opening the heating and sparking circuit, and holding it open until the pressure in the conduit is reduced; or, in other words, during the time the furnace is in operation. After the starting fuel is discharged from the pipe 37, the fuel pressure in the conduit 18 is forced into the pipe at 50 and retains the fuel below the level so that it cannot be forced into the heating box until the pressure is reduced after the furnace is shut down.

To prevent the fuel from overflowing in the drain box 26, or to carry off the waste fuel from the fire box, a pipe 60 is provided, the opposite end of which enters the waste tank 61 and causes the float 62 to rise carrying with it the rod which acts against the switch 63 and opens it thereby closing down the motor.

To remove the fuel from the waste box a U-shaped pipe 64 is provided having one leg passing through the side and extending down into the box and when it is filled too near the top with oil or other fuel it acts as a siphon and passes off through the outside leg into the cup 65.

In an automatic feeding device of this type, it becomes necessary to take special precautions in preventing the main fuel tank from overflowing or overfeeding, and to this end I have devised an automatic feed device in relation to the tank, which allows only sufficient fluid to run out as will keep the burner supplied with sufficient fuel and at the same time enough fuel will be supplied to obtain the highest efficiency. The tank 12 rests in a pan in which fuel is allowed to run gradually, according to the needs or especially to the amount used. From this tank the fluid is led off through the pipe 13 to the burner box. The tank is filled through the pipe 66, which extends nearly to the bottom of the tank for the purpose of preventing air from entering the tank or to keep the opening sealed at all times against the atmospheric pressure. The opening is provided with a cover 67 which is secured to the arm 68 pivoted at 69 on the bracket 70 which is rigidly secured to the tank 12. The cover prevents rubbish from getting into the opening and the tank, and prevents filling unless outlet is sealed. Connected to the arm 68 is a rod 71 the opposite end of which is connected to the spring 72. The opposite end of the spring 72 is connected to a rod 73. The opposite end of the rod 73 is secured to the valve cup 74 which controls the opening of the main fuel outlet 75. When the cover 67 and arm 68 is lifted on the pivot 69 to fill the tank, the cup 74 through the flexible rod connections is raised to a position to close the main fuel outlet to prevent the fuel from running out while the tank is being filled. Connected to the top of the tank and extending downwardly into the pan 76 to a certain distance is the pipe 77 which serves as a vent to let the air in while the fuel is being gradually drained from the tank. That is, a certain amount of fuel is led off through the pipe 13 which uncovers the end 78 of the pipe 77. This allows air to enter the tank and at the same time allows more fuel to flow into the pan until the opening 78 is covered, and the pressure in the tank and outside the tank are balanced, which will remain so until more fuel is taken from the pan and the pipe opening 78 is uncovered, the operation being repeated until the tank is emptied of its fuel. The idea of this device is to allow only such amounts of fuel to be fed down according to the rate it is being used, and is based on a receptacle having a vacuum pressure therein which is sealed by liquid. If the receptacle is partially filled with fluid and the space above the fluid is at a vacuum pressure, the atmospheric pressure against the sealing fluid will hold up the column in the receptacle. But if the seal is broken and air is allowed in, the fluid will flow out in proportion to the amount of air that is let in, until the mouth of the receptacle is sealed again. It can readily be seen that the advantages of this feeding device are great, owing to the fact that fuel is only fed down in proportion to the amount used. A gauge 79 is provided to show the amount of fuel that is taken from the tank and consists of the gauge rod 80 being secured to a float 79 which indicates the height of the fuel in the tank while the tank is being filled. The float is in a sealed tube 81 and the rod is provided with calibrations indicating the amount of fuel in the tank. The fuel and air is automatically regulated by electrical devices which receive power for the source 16 to which is connected the motor circuit 82. This circuit is normally controlled by the switch 83 and is always closed during the automatic control period or when the system is operating. The motor circuit 82 is automatically controlled by the contact switch 97 which is primarily controlled by the thermostat 84 connected to the electric circuit 85. One end of the circuit is connected to a spring 86 which expands and contracts with the change in temperature in the circuit 85. The expansion and contraction of the spring 86 imparts a swinging movement to the lever 87 which in turn raises or lowers the contact rod 68 in relation to the mercury contact 89 located in the movable cup 90. Integral with the cup 90 is a pointer 91 which cooperates with the thermostatic scale 92 for indicating the degrees of temperature to which the heating system is regulated. To start the heating system the indicator 91 is placed opposite a certain calibration on the scale 92 which is constant for a certain temperature. If the constant temperature required is 72 degrees the spring 86 will expand or contract to make and break the contact between the contact rod 88 and the mercury 89 for controlling the system. The make and break contacts 88 and 89 energizes or de-energizes the contact magnet 93 through the relay transformer 94, and the transformer circuit 95 which is connected to the motor circuit 82. The left hand leg of the relay transformer 94 is constantly energized by the motor circuit 82 and circuit 95. When the thermostatic circuit 82 is closed the right hand leg of the transformer 94 is energized which in turn energizes the contact magnet 93 and closes the motor switch contact 97 which starts up the heating system and vice versa. The contact armature 97 is free to swing on the pivot 96 and its movement in one direction is limited by a pin and is constantly pulled backwardly by a spring 77. When the magnet 93 is energized the armature 97 is pulled against the contact 98 and the motor circuit is closed. By closing the motor circuit the impeller 17 of the compressor 14 is caused to rotate which sets up an air pressure in the conduit 18. At the same time the main transformers 99 are energized from the motor circuit which in turn energizes the heating or starting coil 27 and the spark coil 28. By the time the starting and spark coils are sufficiently heated an air pressure is built up in the conduit 18 for operating purposes and to aid combustion in the furnace. The air pressure in the conduit 18 enters the pipe 48 at the point 50 and blows the oil or fuel between the levels 52 and 53 into the pipe 37 and heating chamber 30 around the heating coil which atomizes it to a condition which can be readily fired by the spark coil 28. By this method a very efficient pilot flame for starting is obtained as shown in Figure 3. The pressure in the conduit 18 is sufficient to cause the venturi effect at the throat 21 of the Venturi tube 20 to draw the oil or fuel through the pipe 13 from the main tank 12. The fuel and air form a mixture which is forced into the pilot flame and ignited. This flame with the various regulating devices maintains a constant temperature which can be varied within a certain range. The air pressure from the conduit 18 enters the bellows 55 forcing it upwardly, carrying with it the switch 59 which breaks the contact 100, thereby closing down the main transformer heating and lighting circuit until it is needed again. If the drain box fills up with fuel by accident or non-atomization which would endanger the system it would be led off through the pipe 60 to the waste box 61. As the level in the waste box rises it causes the float 62 to rise carrying with it the rod 58 which lifts the switch 63 off the contact 101 in the thermometer circuit 85. When this circuit is broken it deenergizes one leg of the relay transformer 94 and contact magnet 93 which allows the spring 97ª to pull the armature away from the contact 98 thereby opening the motor circuit and closing down the whole system.

In operation the air compressor 14 is driven by the motor 15 from the source 16 through the circuit 82. The pointer 91 forming a part of the thermostat 84 is set at the desired heat indication on the scale 92 at which time the contacts 88 and 89 are closed, which energizes the relating transformer 94 and contact magnet 93, and closes the contacts 97 and 98, thereby starting up the motor 15 and compressor 14. Simultaneously with this operation the main heating transformer is energized which energizes the heating coil 27 and spark coil 28. At this point in the operation pressure is built up in the conduit 18 which blows the starting fuel out of the pipes 98 and 37 into the heating chamber and around the heating coil 27, and is fired by the spark coil 28 into a pilot flame. The air in the conduit 18 under increased pressure in the Venturi tube 20 draws the fuel from the main tank and mixes with it. It is thrown into the pilot flame and ignited where it is regulated for heating purposes as described. The air pressure opens the switch 59 and cuts out the heating transformer until needed.

In accordance with the provisions of the patent statutes, I have described the principles of operation of my invention, together with the apparatus which I now consider to represent the best embodiment thereof; but I desire to have it understood that the apparatus shown is only illustrative, and the invention can be carried out by the other means.

What I claim as new and desire to secure by Letters Patent of the United States is:—

1. In a heating system comprising a furnace, a fire box for the furnace, means for supplying heating fuel to the fire box, means for supplying starting fuel for igniting the heating fuel, an air blower for projecting air and the heating fuel into the fire box, a heating coil for vaporizing the starting fuel, a spark coil for igniting the vaporized starting fluid and producing a pilot flame for automatically lighting the heating fuel, a large hole in the fire box through which the pilot flame extends, a drain box for clearing the fire box of excess liquid fuel, and a heating chamber in the drain box in which the heating and lighting coils are located for the purpose specified.

2. In a heating system comprising a furnace, a fire box for the furnace, means for supplying heating fuel to the fire box, means for supplying starting fuel for igniting the heating fuel, an air blower for projecting air and the heating fuel into the fire box, a heating coil for vaporizing the starting fuel, a spark coil for igniting the vaporized starting fluid and producing a pilot flame for automatically lighting the heating fuel, a large hole in the fire box through which the pilot flame extends, a drain box for clearing the fire box of excess liquid fuel, a heating chamber in the drain box in which heating and lighting coils are located, baffle means formed integral with the fire box to retain combustible mixture long enough to thoroughly mix it.

3. In a heating system comprising a furnace, a fire box for the furnace, means for supplying heating fuel to the fire box, means for supplying starting fuel for igniting the heating fuel, an air blower for projecting air and the heating fuel into the fire box, a heating coil for vaporizing the starting fuel, a spark coil for igniting the vaporized starting fluid and producing a pilot flame for automatically lighting the heating fuel, a large hole in the fire box through which the pilot flame extends, a drain box for clearing the fire box of excess liquid fuel, a heating chamber in the drain box in which the heating and lighting coils are located, baffle means formed integral with the fire box to retain combustible mixture long enough to thoroughly mix it, and means in relation to the drain box for taking care of the waste fuel.

4. In a heating system comprising a furnace, a fire box for the furnace, means for supplying heating fuel to the fire box, means for supplying starting fuel for igniting the heating fuel, an air blower for projecting air and the heating fuel into the fire box, a heating coil for vaporizing the starting fuel, a spark coil for igniting the vaporized starting fluid and producing a pilot flame for automatically lighting the heating fuel, a large hole in the fire box through which the pilot flame extends, a drain box for clearing the fire box excess liquid fuel, a heating chamber in the drain box in which the heating and lighting coils are located, baffle means formed integral with the fire box to retain the combustible mixture long enough to thoroughly mix it, and a siphon connected to the tank for drawing off the waste fuel.

5. A heating system having, in combination, a furnace comprising means forming a combustion chamber, an air operated liquid fuel pulverizer for supplying mixed air and fuel to said chamber, a blower, a conduit supplying air from said blower to said pulverizer, means comprising a fuel vaporizing and igniting device for forming a temporary pilot light for igniting the air and fuel mixture supplied said chamber by said pulverizer, and air operated means supplied with air from said conduit comprising a fuel measuring chamber for supplying a measured quantity of fuel to said fuel vaporizing and igniting device upon said blower initiating a supply of air to said conduit.

6. A heating system having, in combination, a furnace comprising means forming a combustion chamber, air actuated means for pulverizing liquid heating fuel and feeding it to said combustion chamber, means independent of said air actuated means for forming a temporary pilot light upon initiation of the supply of fuel and air to said chamber comprising a burner, air actuated means comprising a fuel measuring chamber for supplying a measured amount of fuel to said burner, means connecting both air actuated means to a source of compressed air, and means for igniting the fuel supplied said burner.

7. A heating system having, in combination, a furnace comprising means forming a combustion chamber, means including an air blower and a fuel pulverizer for projecting mixed air and heating fuel into said chamber, means for igniting said heating fuel comprising a fuel receptacle and an associated heater for vaporizing liquid fuel delivered thereto, igniting means for the vaporized fuel from said receptacle, and means controlled by the air delivered by said blower for automatically upon initiation of the operation of said blower delivering a measured quantity of liquid fuel to said receptacle.

8. A heating system having, in combination, a furnace comprising means forming a combustion chamber, means including an air blower and a fuel pulverizer for projecting mixed air and heating fuel into said chamber, means for igniting said heating fuel comprising a fuel receptacle and an associated heater for vaporizing liquid fuel delivered thereto, igniting means for the vaporized fuel from said receptacle, a container for fuel, means for automatically delivering a measured quantity of liquid fuel to said container upon cessation of operation of said blower, and means actuated by the air supplied by said blower for automatically delivering said liquid fuel from said container to said receptacle upon initiation of the operation of said blower.

9. A heating system having, in combination, a furnace comprising means forming a combustion chamber, means including an air blower and a fuel pulverizer for projecting mixed air and heating fuel into said chamber, means for igniting said heating fuel comprising a fuel receptacle and an associated heater for vaporizing liquid fuel delivered thereto, igniting means for the vaporized fuel from said receptacle, a container of relatively small capacity for fuel having an inlet and an outlet, said outlet being in fluid communication with said receptacle, means in communication with said inlet for supplying fuel to said container by gravity and automatically maintaining a predetermined, relatively small quantity of fuel therein when said blower is inoperative, and a conduit placing said container in fluid communication with the delivery of said blower, whereby a measured quantity of fuel will be supplied to said receptacle each time the blower is put into operation.

10. A heating system having, in combination, a furnace comprising a combustion chamber, means including an air blower and fuel pulverizer for projecting mixed air and pulverized heating fuel into said chamber, means for forming a pilot light for igniting said heating fuel, the last named means comprising a fuel receptacle and a heater for vaporizing the fuel delivered thereto, means for igniting the fuel vaporized by said heater, means for automatically supplying a measured quantity of liquid fuel to said receptacle upon initiation of the operation of said blower comprising a substantially U-shaped container in fluid communication with said receptacle and the delivery of said blower, and means for supplying fuel to said container.

11. A heating system having, in combination, a furnace comprising a combustion chamber, means including an air blower and fuel pulverizer for projecting mixed air and pulverized heating fuel into said chamber, means for forming a pilot light for igniting said heating fuel, the last named means comprising a fuel receptacle and a heater for vaporizing the fuel delivered thereto, means for igniting the fuel vaporized by said heater, means for automatically supplying a measured quantity of liquid fuel to said receptacle and for operating said heater upon initiation of the operation of said blower, and means for rendering said heater inoperative shortly after initiation of the operation of said blower.

12. A heating system having, in combination, a furnace comprising means forming a combustion chamber, means including an air blower for projecting mixed air and heating fuel into said combustion chamber, means igniting said heating fuel comprising fuel vaporizing and igniting means for producing a pilot light, means for automatically supplying a predetermined amount of fuel to said fuel vaporizing means upon initiation of the operation of said blower, said vaporizing and igniting means being electrically operated, and a switch mechanism controlled by the air delivered by said blower for rendering said last named means inactive shortly after the initiation of operation of said blower.

13. A heating system having, in combination, a furnace comprising means forming a combustion chamber, means including an air blower for projecting mixed air and heating fuel into said combustion chamber, means igniting said heating fuel comprising fuel vaporizing and igniting means for producing a pilot light, means for automatically supplying a predetermined amount of fuel to said fuel vaporizing means upon initiation of the operation of said blower, said vaporizing and igniting means being electrically operated, and a switch controlled by an expansible chamber device in communication with the delivery of said blower for rendering said last named means inoperative shortly after the initiation of operation of said blower.

14. A heating system having, in combination, a furnace comprising means forming a combustion chamber, means including an air blower for projecting mixed air and heating fuel into said combustion chamber, means igniting said heating fuel comprising fuel vaporizing and igniting means for producing a pilot light, means for automatically supplying a predetermined amount of fuel to said fuel vaporizing means upon initiation of the operation of said blower, said vaporizing and igniting means being electrically operated in response to initiation of operation of said blower, and means responsive to the delivery of air by said blower for rendering said igniting and vaporizing means inoperative shortly after the initiation of operation of said blower.

DUNCAN DANA.